Feb. 11, 1958 D. G. SCORGIE 2,823,348

PHASE LEAD NETWORK

Filed Dec. 29, 1952 3 Sheets-Sheet 1

INVENTOR
DONALD G. SCORGIE

BY D. G. Snyder
Howard White
ATTORNEYS

Feb. 11, 1958 D. G. SCORGIE 2,823,348

PHASE LEAD NETWORK

Filed Dec. 29, 1952 3 Sheets-Sheet 2

INVENTOR
DONALD G. SCORGIE

BY [signature]

ATTORNEYS

Feb. 11, 1958 D. G. SCORGIE 2,823,348

PHASE LEAD NETWORK

Filed Dec. 29, 1952 3 Sheets-Sheet 3

INVENTOR
DONALD G. SCORGIE

BY [signature] [signature] ATTORNEYS

United States Patent Office 2,823,348
Patented Feb. 11, 1958

2,823,348

PHASE LEAD NETWORK

Donald G. Scorgie, Upper Marlboro, Md.

Application December 29, 1952, Serial No. 328,538

8 Claims. (Cl. 323—89)

(Granted under Title 35, U. S. Code (1952), sec. 266)

This invention relates to electrical control circuits utilizing the follow up system of motor control, and more particularly to improvements in networks that provide a proportional plus derivative signal useful in stabilizing such electrical control systems.

The general problems involved in using phase lead networks suitable for deriving proportional plus derivative signals for stabilizing control systems utilizing A. C. servomechanisms and like devices have been discussed in an article by Donald McDonald appearing in AIEE Transactions 69: 293, 1950, titled "Improvements in the characteristics of A. C. lead networks for servo mechanisms." As pointed out in this article, the types of lead networks in most common use suffer from numerous disadvantages. One type is primarily a D. C. device and requires a demodulator and a modulator if it is to be used in an A. C. circuit. This type, referred to as a class I network, is a 3-terminal 2 line system using parallel connected resistance and capacitance elements in one line with a second resistance element connected across the load. The great disadvantage associated with this particular system lies in the fact that the noise-to-signal ratio is increased considerably by the incorporation of the modulator and demodulator, and the positive phase shift produced by the network is considerably reduced. Various modifications of the basic class I network are discussed in the article that overcome the aforementioned disadvantages to some extent but these networks still leave much to be desired.

Also mentioned in the article are class II lead networks that may be used in A. C. circuits without the incorporation of demodulators and modulators. The class II networks are detrimentally affected by changes in carrier frequency, however, and the maximum value of lead time constant is limited. Both the class I and class II type networks have the further disadvantage that they absorb a considerable amount of power, particularly when the following stage must be a low impedance device. The reason is that for large time constants, either large resistors or large capacitors must be used in the above circuits; as reliable capacitors are not available having the required characteristics, large series resistances must be used.

Accordingly, one object of this invention is to provide an A. C. phase lead network for use in cascade with other elements in a control loop, that will compensate for the lagging phase characteristics of the other circuit elements.

Another object of this invention is to provide an A. C. lead network suitable for operation over a wide band of frequencies.

Still another object of this invention is to provide an A. C. lead network that will absorb only a small amount of power and that will not be detrimentally affected by low impedance loads.

A still further object of this invention is to provide a lead network having a high signal-to-noise ratio.

Other objects and features of the present invention will become apparent upon consideration of the following detailed description in connection with the accompanying drawings which illustrate typical embodiments of the invention. It is to be expressly understood, however, that the drawings are designed for purposes of illustration only and not as a definition of the limits of the invention, reference for the latter purpose being had to the appended claims.

In the drawings:

Figure 1*a* is a schematic diagram of one embodiment of applicant's invention.

Figure 1*b* is an idealized diagrammatic representation of the magnetic characteristics of one of the circuit elements used in practicing applicant's invention.

Figure 1*c* is a waveform representation of the output and input voltages of the embodiment shown in Figure 1*a*.

The present invention approaches the problem of overcoming the defects of prior art lead networks by making use of the "memory" capabilities of saturable core reactors having high remanence properties. By utilizing the saturation level of the saturable iron core to "store" information concerning the instantaneous condition of an electrical signal, and then comparing this information with the magnetization level set by the immediately precedent condition of the signal, it has been found possible to obtain an output signal that will measure the changes that have occurred in the measured signal in the time interval between the immediate past and the present. At will be explained, the output signal from the present network is in the form of a "proportional plus derivative;" i. e. it will contain one component which is proportional to the original input voltage and another component which is proportional to the rate of change (derivative) of the input voltage with respect to time.

Figure 1A:
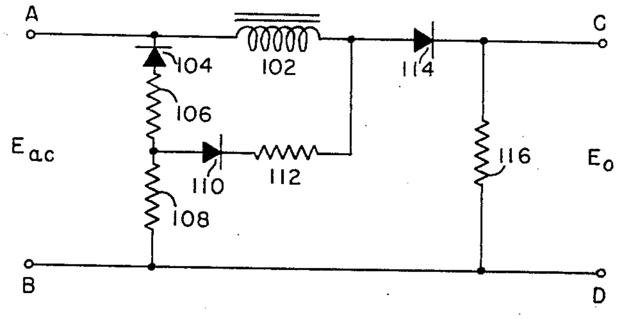

With reference now to Figure 1*a*, terminals A and B represent the input terminals of the first embodiment of the present invention to which an alternating voltage (typically a sinusoid), $E_{ac}$ is applied. This voltage may be derived from an amplifier or other device in the system to be controlled. The output terminals from the network are indicated at C and D, from which a half-wave lead output voltage $E_0$ is derived. A saturable core reactor 102 is placed in series between terminals A and C as is unilateral conducting element 114. The latter is connected between saturable core reactor 102 and the output of the circuit and is poled so as to permit current flow only from the input circuit to the output and to prevent current from flowing back into the input circuit from the output. Saturable core reactor 102 is preferably a wound toroid using core materials with a square hysteresis loop such as those commonly known as Deltamax and Orthonol.

Figure 1B:
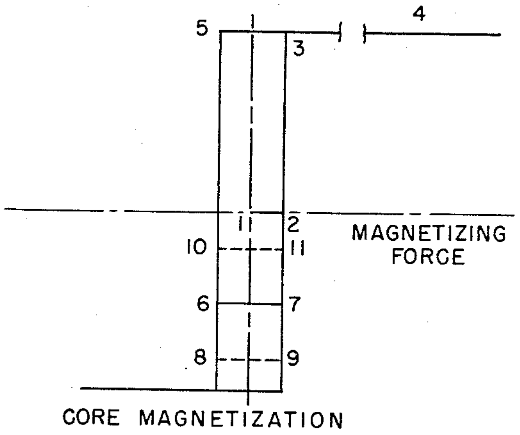

Also included in the network is a second unilateral conducting element 104 arranged to couple a voltage divider comprising resistance elements 106 and 108 across the input terminals A and B. Unilateral conducting element 104 is polarized in such a manner that the input voltage $E_{ac}$ will be applied across the voltage divider only during the time that the series element 114 prevents current flow from terminal A to terminal C; that is, when a positive voltage exists at terminal B with respect to terminal A. A third unilateral conducting element 110 in series with resistance element 112 connects the junction point of resistances 106 and 108 to the junction point of saturable core reactor 102 and unilateral conducting element 114. The polarity of unilateral conducting element 110 is the same as that of element 104; that is, it will pass current only when the voltage at terminal B is positive with respect to that at terminal A. Resistance element 116 is connected across output terminals C and D to provide a path for the flow of magnetization current for reactor 102. Saturable core reactor 102 preferably has a square hysteresis loop such as shown in Figure 1*b*. The properties of inductors having such square hysteresis loops may be found in the text "Ferromagnetism," by R. M. Bozarth, New York; Van Nostrand, 1951. For present purposes such inductors may be thought of as a memory device, as has been mentioned before.

The operation of the embodiment shown in Figure 1*a* will now be explained with reference to the magnetization curve of satuable core reactor 102 shown in Figure 1*b*.

Assume first that a sine-wave input voltage having a peak amplitude $E_{ac1}$ is placed across terminals A and B and that the initial magnetization level of the core is at 1 in Figure 1*b*. Further assume that the first half cycle of applied voltage is with the voltage at terminal A swinging positive with respect to that of terminal B. During the interval unilateral impedance 104 is non-conducting and thus decouples the voltage dividing resistors 106 and 108 from across the input terminals A and B; thus current will flow only through saturable core reactor 102, unilateral conducting element 114, and resistance element 116. With reference to Figure 1*b*, it can be seen that before core saturation the output current is limited to the magnetization current as determined by the characteristics of the magnetic material in saturable core reactor 102; in other words, the output current during the interval terminal A is swinging positive and reactor 102 is proceeding to saturation is limited to that required to produce the magnetizing force depicted between points 1 and 2 of Figure 1*b*. This condition will continue until the reactor reaches saturation, shown at point 3 of Figure 1*b*. The voltage across the reactor 102 during the voltage interval required to produce core saturation is high because of its high inductive reactance but the reactance and the voltage across the reactor will fall to a very low value the instant the core of reactor 102 saturates. The current through reactor 102 and resistance 116 after saturation of reactor 102 will be limited only by the resistance in the circuit until the end of the half cycle of operation during which terminal A is positive with respect to terminal B. This half cycle of operation will henceforth be called the "forward half cycle."

During the next half cycle of applied voltage (which will be termed the "reset half cycle"), the voltage at point B will now become positive with respect to that at terminal A, whereby unilateral conducting element 114 is rendered non-conducting to thus decouple the output circuit and resistance 116 from the rest of the phase lead circuit.

Unilateral conducting devices 104 and 110 are now rendered conducting, however, to thereby apply a reset voltage across reactor 102, of a magnitude which is partially determined by the ratio of resistance 106 to the sum of resistances 106 and 108. This voltage which is opposite in sign to the first half cycle applied voltage, withdraws the core of reactor 102 from saturation so that at the end of the half cycle of operation when terminal B is positive with respect to A, the magnetization level of inductor 102 will be reset to some point 6, for example, of the magnetization curve of Figure 1*b* as determined by the magnitude of the voltage developed across resistor 106. During the succeeding cycles of operation, if the peak voltage level of the applied signal $E_{ac}$ does not change, the magnetization of reactor 102 will follow the rectangle 7, 3, 5, 6, of Figure 1*b*. As only a given amount of hysteresis energy is needed to carry the magnetization level from 7 to 3 the remaining energy available to the system in each forward half cycle will be delivered to resistance element 116 and the output load.

Assume now, that the peak amplitude of the input voltage increases to $E_{ac2}$ at the conclusion of a reset half cycle. This will mean that the volt-seconds required to saturate the core starting from the magnetization level, 6—7 determined by the previous reset half cycle, will be reached earlier in the first forward half cycle following the increase in applied voltage, and that the output voltage across resistance 116 will be considerably increased in magnitude. However, the output pulses following the first output pulse will be smaller in amplitude than the first output pulse due to the fact that the following reset half cycles will bring the magnetization level further down on the hysteresis curve. This condition is shown by 8, 9 on Figure 1*b*.

Figure 1C:
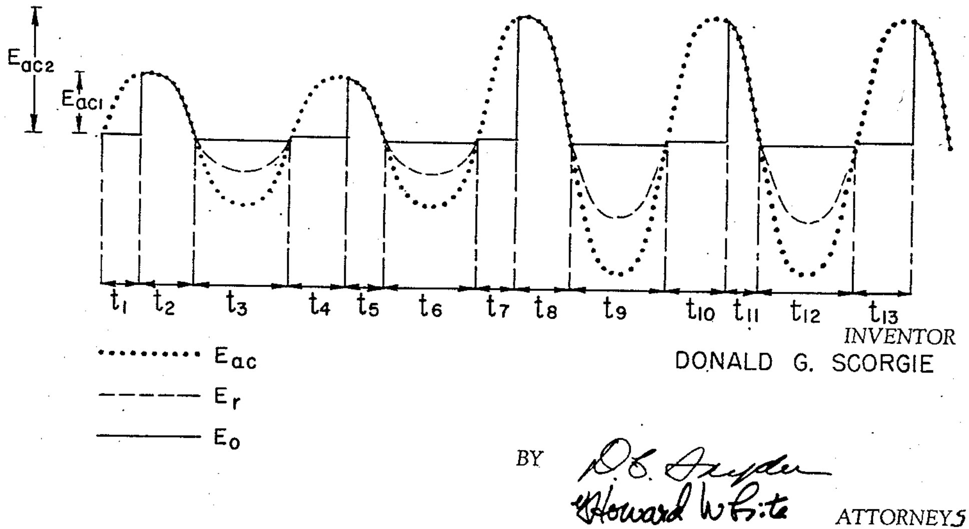

Considering the foregoing discussion in connection with Figure 1*c*, the applied A. C. voltage $E_{ac}$ shown as a dotted line is again shown as having initial maximum amplitude $E_{ac1}$. The output voltage, $E_0$ shown in solid lines, is of very small amplitude over the period $t_1$ which represents the time required to bring reactor 102 from an original un-magnetized state (1 in Fig. 1*b*) to a state of saturation (3 in Fig. 1*b*). The output voltage during this interval is due only to the flow of magnetization current. As explained before, after saturation the output voltage $E_0$ will jump to a value determined by the resistance in the circuit, and will follow the applied voltage $E_{ac}$ for all practical purposes, until the end of the first forward half cycle. During the reset half cycle over the time interval $t_3$, the output voltage will be zero due to the operation of unilateral conducting element 114 as explained before.

During the reset half cycle the voltage applied to reactor 102 will be a predetermined fraction of the applied voltage. This reset voltage $E_r$ which is determined by the voltage divider 106 and 108 is denoted by the dashed lines in the curves of Figure 1*c*. The area under this curve during time $t_3$ is a measure of the extent of the change in magnetization of reactor 102 during the reset half cycle. During time $t_4$ reactor 102 is again brought up to saturation, and the output pulse will be substantially as shown during time interval $t_5$ as long as the applied voltage $E_{ac}$ remains constant.

However when the applied voltage $E_{ac}$ is changed from a maximum amplitude to $E_{ac1}$ to $E_{ac2}$ during the forward half cycle, the time required for the applied voltage to saturate the core of reactor 102 will be greatly decreased from a time interval corresponding to $t_4$ to an interval corresponding to $t_7$. As a result, the initial output pulse following this sudden increase will consist of a large pulse having substantially the wave shape shown during time $t_8$. During succeeding forward half cycles however, as long as the applied voltage remains at $E_{ac2}$ the output pulses will be somewhat lower in amplitude as shown at $t_{11}$ than the initial pulse depicted at $t_8$. As previously described, this action is due to the fact that the increased voltage operates during the reset half cycles to lower the reset magnetization from a level such as 6—7 (Fig. 1*b*) to a lower level such as depicted at 8—9.

Returning to Figure 1*a*, the function of resistance 112 is primarily to compensate for differences in forward resistance of the various rectifiers in the circuit at low voltages. Under low voltage operating conditions, the forward resistance of unilateral impedance element 114 tends to increase considerably, as does that of element 104. The result is that the output voltage drops excessively due both to the resulting increases of reset voltage, and to the increase in series resistance to load current flow offered by element 114. By inserting resistance 112, the reset voltage is considerably decreased at low voltages so that the output voltage will be of the proper value. Unilateral conducting element 110 prevents current from flowing thru reactor 102 and resistances 112 and 108 after saturation of reactor 102, and is especially necessary when resistance 108 is of a low value. Such current flow would obviously result in an undesirable amount of power being drawn from the source, and would also adversely affect the output voltage and prevent correct operation of the circuit.

In order to determine the nature of the output of the lead circuit under consideration, we will first assume that at the beginning of the reset half cycle, the core is saturated (i. e., at the upper end of Figure 1*b*). The integral of the input voltage during the reset half cycle is $\int_r E_{ac}(t)dt$ and the voltage integral impressed upon the core is $\gamma\int_r E_{ac}(t)dt$, where $\gamma = R_1/(R_1+R_2)$, $R_1$ corresponding to resistance 106 of Figure 1, and $R_2$ to resistance 108. The flux level will, therefore, change $N \times 10^8 \times \gamma\int_r E_{ac}(t)dt$, where N is the number of turns upon the core. The input might be some function such as $E_{ac}(t) = E_{ac}(t) \sin wt$, where the coefficient on the right can be any function of time. On the forward half cycle the magnitude will, in general, be different from its value on the previous reset half cycle, and the area of the forward half cycle will be designated $\int_f E_{ac}dt$.

Until such time as the core saturates on the forward half cycle, it absorbs the full input voltage provided the voltage drop across resistance 116 due to the magnetizing current is small. After saturation, the full input voltage is impressed across resistance 116. Therefore, the integral of voltage across resistance 116 during the forward half cycle is:

$$\int_f E_0 dt = \int_f E_{ac}(t)dt - \gamma\int_r E_{ac}(t)dt \qquad (2)$$

adding and substracting $\gamma\int_f E_{ac}dt$ to the right half of Equation 2 we get:

$$\int_f E_0 dt = (1-\gamma)\left\{\int_f E_{ac}dt + \left(\frac{\gamma}{1-\gamma}\right)\left[\int_f E_{ac}dt - \int_r E_{ac}dt\right]\right\} \qquad (3)$$

If the input magnitude is not varying, the term in the square brackets on the right will be zero and the output will simply be proportional to the input. Equation 3 can be written in more meaningful symbols after first dividing through by the half period time $\Delta t$. The average output on the forward half cycle is defined by $$G_0 \equiv (\int_f E_0 dt/\Delta t)$$

and the average input during the same interval by $$G_a \equiv \int_f E_{ac}dt/\Delta t$$

The quantity in the square brackets of Equation 3, when divided by $\Delta t$ is the change in two successive half-period averages of input and is designated $\Delta G_a$. By multiplying and dividing $\Delta G_a$ by $\Delta t$, $\pi/\omega \times \Delta G_a/\Delta t$ is obtained. By definition $T = [\gamma/(1-\gamma)] \cdot \pi/\omega$, and $\omega = 2\pi f$, and the second term on the right of Equation 3 becomes $T\Delta G_a/\Delta t$. If the frequency at which the average input varies relative to the frequency "*f*" of the carrier E is low, the ratio of increments becomes very nearly a derivative and we shall assume that $\Delta G_a/\Delta t = dG_a/dt$. Equation 3 then becomes $$G_0 = (1-\gamma)\left(G_a + T\frac{dG_a}{dt}\right) \qquad (4)$$

The constant $\gamma$ can be varied from zero to unity; correspondingly, the time constant, T, varies from zero to infinity. Therefore it can be seen that the time constant can be readily adjusted to any value necessary to compensate any particular circuit simply by varying the ratio of resistance 106 to the sum of resistances 106 and 108. This can be easily accomplished by utilizing an ordinary potentiometer for resistance elements 106 and 108 and connecting the tap to unilateral impedance element 110. It should be noted, however, that T is inversely proportional to the frequency of the carrier.

Equation 4 shows the "proportional-plus-derivative" relationship between the input voltage and the average output. The only assumptions necessary were that the frequency at which the input is varied is lower than the carrier frequency and that the magnetizing current of the core results in negligible voltage drops in the circuit resistances.

As the alternating current signal to be controlled can be fed directly to the input of the circuit of Figure 1, and as the output is in a form that can be used directly to control the energizing coil of a carbon pile voltage regulator or other like control device, it can be seen that the need for a modulator and a demodulator is entirely eliminated along with the deleterious affects accompanying the incorporation of such devices in a cascade control circuit. Likewise, as the amount of series resistance is very small, the power consumed by the lead circuit will be only of negligible proportions. The circuit is somewhat sensitive to changes in carrier frequency as, with a given load resistance and a given rectified average input, more energy is available to supply the load in a single half cycle of a lower frequency carrier; however the circuit is much less frequency sensitive than the prior art networks mentioned above as the proportional part of the output signal is independent of frequency as shown in the above mathematical analysis.

While the operation of the circuit shown in Figure 1*a* has been discussed assuming that the change in amplitude of the input signal is positive (that is, that there is an increase in amplitude of the input signal), the above remarks are equally applicable when the change is such that the amplitude decreases. In this case the magnetization of the core will not be as great during the reset half cycles and the output pulse following the change will be reduced according to the additional part of the forward half cycle required to saturate the core from the level of magnetization determined by the reset half cycle preceding the change. Therefore the derivative component of the output pulse will appear as a negative voltage with respect to the proportional component. On following reset half cycles, the minimum magnetization level will be set at a higher value, such, for example, as shown by 10—11 in Figure 1*b*.

The circuit described above has the disadvantage that only part of the derivative term will appear if a step change occurs at any time other than at the beginning of a half cycle. If the change occurs at the beginning of the forward half cycle the full derivative term will appear in the output, but if it happens at the beginning of the reset half cycle no derivative term whatsoever will appear. To understand why this is so, assume first that an increase in voltage occurs at the beginning of a reset half cycle. In this case the core magnetization will be set at a new magnetization level starting from complete saturation, and core saturation will be achieved at the same instant in the next forward half cycle it would have had no change occurred in the input signal. In other words, the magnetization level set during the reset half cycle is indicative of the input signal condition during the previous half cycle, so that if the step change occurs at the beginning of the reset half cycle, the magnetization level is entirely determined by new circuit conditions. Therefore, only a proportional term will appear in the output if the increase occurs at the beginning of the reset half cycle. When an increase occurs during the forward half cycle, before the core is saturated, core saturation will be reached earlier than if no change had occurred but not as early as if the change had occurred at the beginning of the half cycle. Therefore only part of a derivative term will appear in the output signal. After an increase in input voltage, saturation will result in a corresponding increase in the output voltage inasmuch as the core reactance is practically zero and this increase will also contain a portion of a derivative term. Generally speaking, the later in the forward half cycle that the increase occurs, the smaller will be the derivative term in the output. It can be seen that an increasing change that occurs during the reset half cycle will result in the core magnetization being set to a lower value than would have been achieved if no change had occurred, but to a higher value than would have resulted had the change occurred at the beginning of the reset half cycle. As the change occurs later and later in the reset half cycle, the magnetization level will become more truly indicative of the condition of the input signal during the previous cycle. The derivative term will therefore increase in magnitude as the instant at which the input signal changes is moved later into the reset half cycle.

Figure 2:
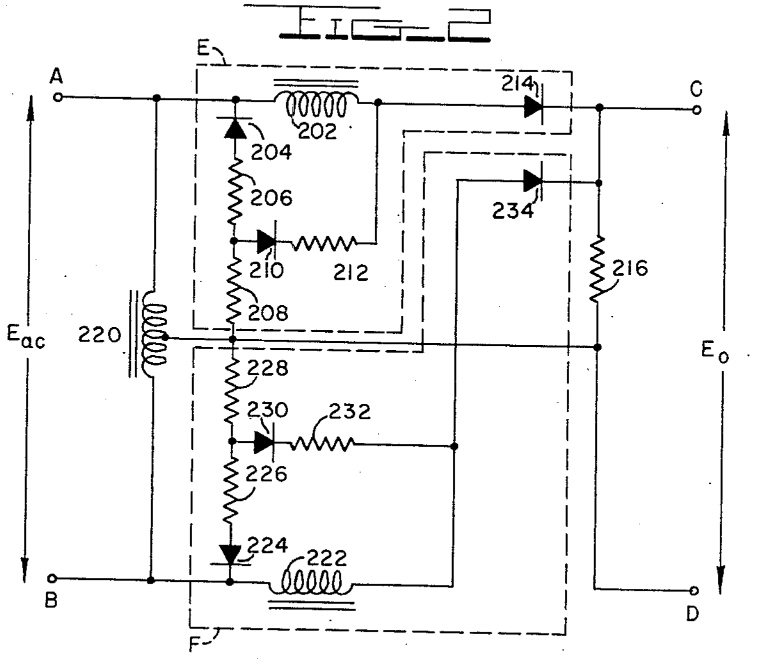
Figure 2 is a schematic diagram of another embodiment of applicant's invention useful where it is desirable to provide a full-wave D. C. output with respect to the input voltage.
Figure 3:
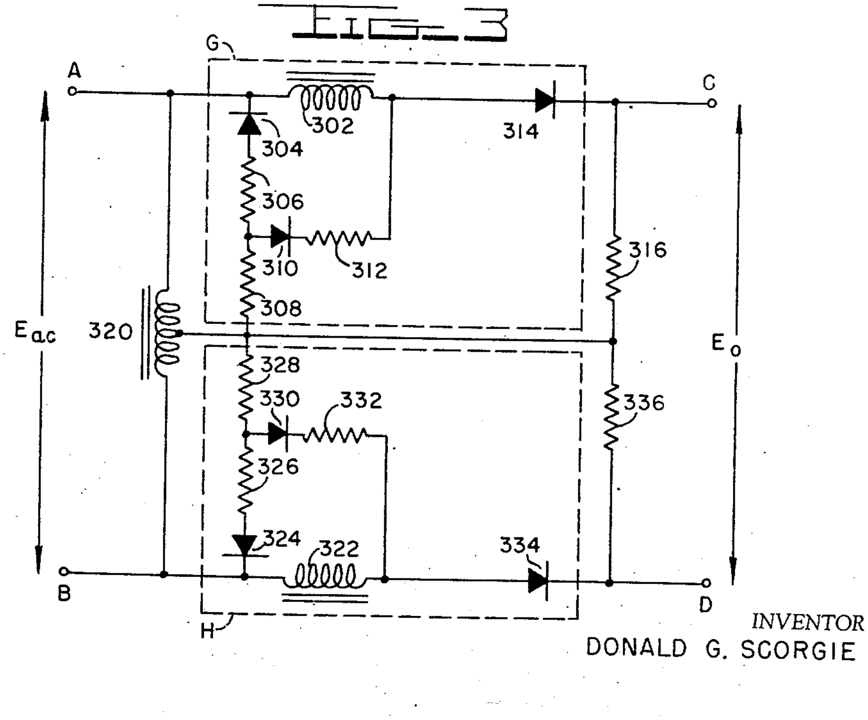
Figure 3 is a schematic diagram of still another embodiment of applicant's invention that is useful where an A. C. output is desired.
Figure 4:
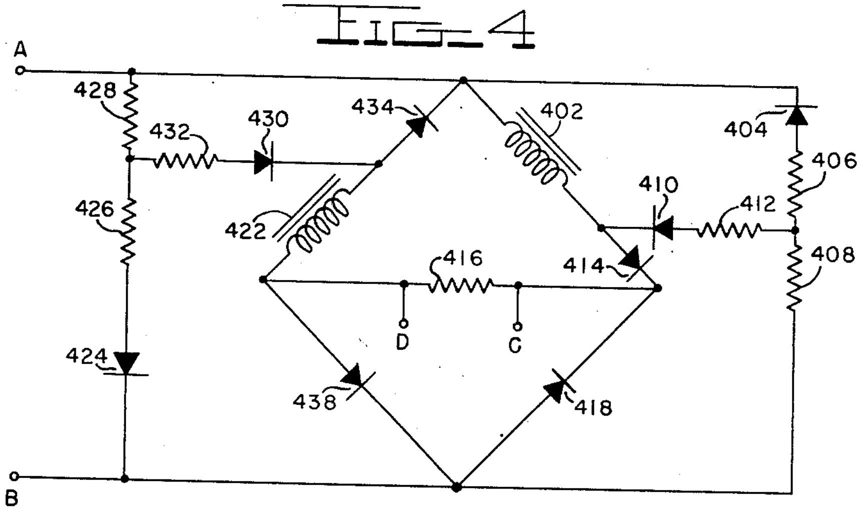
Figure 4 is a schematic diagram of an alternative embodiment to Figure 2 for deriving a full-wave D. C. output, in which certain of the circuit elements of the embodiment shown in Figure 2 are eliminated.

The circuits shown in Figures 2, 3 and 4 are sensitive to changes that occur at any time during the reset half cycle or the forward half cycle and alleviate the above deficiences of the circuit of Figure 1*a*. With reference to Figure 2, it can be seen that circuits E and F are identical to the circuit shown in Figure 1*a* up to the output of unilateral conducting element 114. Center-tapped choke 220 is inserted between input terminals A and B to provide a push-pull input to circuits E and F, as will be explained. Saturable core reactor 202 is inserted in that section of the line connected to terminal A, and saturable core reactor 222 of circuit F is connected to terminal B. By combining the outputs of amplifiers E and F in parallel across load resistance 216 (said load resistance being connected between terminals C and D), and by connecting the center-tap of input choke 220 to terminal D and to the junction point of resistances 208 and 228 (said resistances 208 and 228 corresponding to resistance 108 of Figure 1) there is effectively obtained a push-pull input and a parallel output. The push-pull input and parallel output manner of connection described provides a "full-wave output" as compared to a "half-wave output" obtained by means of the circuitry of Figure 1. A push-pull input is furnished inasmuch as the center-tap of choke 220 is the electrical center of terminals A and B, so that when a sinusoidal voltage is placed on terminals A and B, the voltage across the input of circuit E will always be equal and opposite to that across the input of circuit F.

In operation, circuit E will produce a positively polarized pulse output when terminal A is positive with respect to terminal B, this cycle of operation being the reset cycle for circuit F. Likewise circuit F will provide a positive pulse output when terminal B is positive with respect to terminal A, this being likewise the reset half cycle of circuit E. Thus it can be seen that if the input change occurs as a step function at the beginning of the half cycle when B is positive with respect to A, circuit F alone will provide a proportional-plus-derivative output. Likewise if the step function occurs at the beginning of the half cycle when terminal A is positive with respect to terminal B circuit E alone will provide a proportional-plus-derivative output. If the change occurs at any time during a half cycle other than its beginning, each circuit will have a portion of a derivative term in its output, and the sum of the derivative terms will be theoretically equal to the derivative terms that would have appeared had the change occurred at the beginning of a half cycle.

The embodiment shown in Figure 3 is similar to that shown in Figure 2, circuit G being identical to circuit E and circuit H being identical to circuit F. Likewise the manner of connecting input choke 320 to the junction point of the voltage dividers of the individual circuits is the same as shown in Figure 2. The only difference between Figure 3 and Figure 2 lies in the manner of connecting the outputs of the individual lead networks. As can be seen, circuit G is provided with output resistor 316 connected between the output of unilateral conducting element 314, terminal C, and the center-tap of choke 320, and circuit H is provided with output resistor 336 connected between unilateral conducting element 334, terminal D, and the center-tap of choke 320. In operation, on first alternate half cycles circuit G will be on its forward half cycle and circuit H will be on its reset half cycle, and a voltage pulse will appear at terminal C of positive polarity with respect to terminal D. On second alternate half cycles circuit H will be on its forward half cycle and circuit G will be on its reset half cycle, and a voltage pulse will appear at terminal D of positive polarity with respect to terminal C; i. e. on second alternate half cycles, terminal C will be of negative polarity with respect to terminal D. The output voltage appearing between output terminals C and D thus will be an A. C. voltage as compared to the "half-wave" voltage output of Figure 1 and the "full-wave" voltage output of Figure 2.

In Figure 4 there is shown an embodiment that will provide the same type of output as will the embodiment shown in Figure 2. This circuit however has the advantage that input choke 220 is eliminated. In this embodiment unilateral conducting elements 414, 418, 434 and 438, saturable core reactors 402 and 422, and output resistance 416 are connected in a bridge network between input terminals A and B. Unilateral conducting element 438 and 418 each provide an arm of the bridge, element 438 being polarized so that current can flow only in the direction of terminal B and element 418 being polarized so that current can flow only away from terminal B and in the direction of output terminal C. Saturable core reactor 402 and unilateral conducting element 414 connected in series comprise the third arm of the bridge and saturable core reactor 422 and unilateral conducting element 434 in series furnish the fourth arm of the bridge. Saturable core reactor 402 is connected to terminal A and saturable core reactor 422 is connected to terminal D; the unilateral conducting element 434 couples reactor 422 to terminal A when terminal B is positive with respect to terminal A, and unilateral conducting element 414 couples reactor 402 to terminal C when terminal A is positive with respect to terminal B. One terminal of load resistance 416 (terminal C) is connected to the juncture of unilateral conducting elements 414 and 418 and the other terminal of load resistance 416 (terminal D) is connected to the juncture of unilateral conducting elements 438 and reactor 422. A voltage divider comprising resistances 406 and 408 is connected between terminals A and B in series with a unilateral conducting element 404 polarized so as to prevent current flow in the direction of terminal B. Likewise a second voltage divider comprising resistances 426 and 428 is connected across the line in series with a unilateral conducting element 424 that prevents current flow through the resistance in the direction of terminal A. Unilateral conducting element 404 is inserted between terminal A and resistance 406, and unilateral conducting element 424 is inserted between terminal B and resistance element 426, resistance 408 being connected to terminal B and resistance 428 being connected to terminal A. The juncture of resistances 406 and 408 is connected to the juncture of unilateral conducting element 414 and saturable core reactor 402 through resistance 412 and unilateral conducting element 410; likewise the juncture of resistance elements 426 and 428 is connected to the juncture of unilateral conducting element 434 and saturable core reactor 422 through resistance 432 and unilateral conducting element 430.

The operation of the embodiment shown in Figure 4 is as follows. The forward half cycle of the section of the lead network including saturable core reactor 402 will occur when terminal A is positive with respect to terminal B, and current will flow through saturable core reactor 402, unilateral conducting elements 414 and 438 and load resistance 416. At the same time saturable core reactor 422 will be on its reset half cycle due to the operation of the voltage divider including resistance elements 428 and 426 and unilateral conducting element 424. Likewise when terminal B is positive with respect to terminal A saturable core reactor 422 will be on its forward half cycle and saturable core reactor 402 will be on its reset half cycle. The reset voltage for saturable core reactor 402 is derived from the voltage divider including resistance elements 406 and 408 and unilateral conducting element 404. On the forward half cycle of saturable core reactor 422 current will flow through reactor 422, element 434, load resistance 416 and element 418. It will be noted that current will always flow through the load resistance in the same direction so that in effect a full-wave output is provided.

Although the embodiments disclosed in the preceding specification are preferred, other modifications will be apparent to those skilled in the art which do not depart from the scope of the broadest aspects of the present invention.

The invention described herein may be manufactured and used by or for the Government of the United States of America for governmental purposes without the payment of any royalties thereon or therefor.

What is claimed is:

1. A phase lead network for receiving an alternating input voltage signal and deriving therefrom a proportional-plus-derivative output signal comprising, saturable reactor means having high remanence properties, means connecting the alternating input voltage to said reactor means, unilateral conductor means connected in series with said reactor means so that said reactor means proceeds to saturation only on first polarity half cycles of input voltage, and means including a voltage divider circuit coupled to the input of the network and to said reactor means to impose a predetermined proportion of said input voltage across said reactor means only on second polarity half cycles of input voltage for resetting said reactor means to a level of magnetization dependent on said predetermined portion.

2. A phase lead network for receiving an alternating input voltage and deriving therefrom a proportional-plus-derivative output signal comprising, saturable reactor means having high remanence properties, means connecting the alternating input voltage to said reactor means, unilateral conductor means connected in series with said reactor means so that said reactor means proceeds to saturation only on first polarity half cycles of input voltage, and means including a serially connected voltage divider means and a unilateral conducting means coupled to the input of the network and to said reactor means to receive said input voltage and to impose a predetermined portion thereof across said reactor means only on second polarity half cycles of input voltage for resetting said reactor means to a level of magnetization dependent on said predetermined portion.

3. A phase lead network for receiving an alternating voltage input signal and deriving therefrom proportional-plus-derivative output signals comprising, first and second saturable reactor means having high remanence properties, means applying said input voltage to said reactor means in push-pull, means including a unilateral conductor device connected in series with each of said reactor means so that each of said reactor means proceeds to saturation only on alternate half cycles of input voltage, means coupled to the input of the network and to said reactor means for applying a predetermined portion of said input voltage to each of said reactor means only on alternate half cycles of input voltage other than those on which said reactor means is allowed to proceed to saturation, and means connecting the outputs of said reactor means in parallel to derive output signals of the same polarity from said reactor means.

4. A device for coupling to an output circuit the proportional-plus-derivative voltage of an alternating voltage comprising, a saturable magnetic core member coupled to said alternating voltage and having a winding placed thereon, means including a unidirectional conducting device coupled to said winding and operative to deliver only the odd half cycles of said alternating voltage to the output circuit through said winding, said odd half cycles being effective to establish a saturating flux in said core member, means including a unilateral conductivity voltage reducing circuit for deriving from said alternating voltage a signal during the even half cycles of said alternating voltage and equal to a predetermined amplitude fraction of said alternating voltage, and means coupling said half wave signal to said winding for establishing a predetermined degree of saturation of said core in response to said half wave signal.

5. A device for coupling to an output circuit the proportional-plus-derivative voltage of an alternating voltage comprising, a saturable magnetic core member of high remanence properties coupled to said alternating voltage and having a winding placed thereon, unidirectional conducting means coupled to said winding and operative to deliver only the odd half cycles of said alternating voltage to the output circuit through said winding, said odd half cycles being effective to establish a saturating flux in said core member, means including a unidirectional voltage dividing circuit for deriving from said alternating voltage a half wave signal corresponding to the even half cycles of said alternating voltage and equal to a predetermined amplitude fraction of said alternating voltage, and means coupling the output of said unidirectional voltage dividing circuit to the winding of said saturable magnetic core member for establishing a predetermined degree of saturation of said core in response to said half wave signal.

6. A device for coupling to an output circuit the proportional-plus-derivative voltage component of an alternating voltage, comprising a saturable magnetic core member of high remanence properties coupled to said alternating voltage and having a winding placed thereon, means including a first unilateral conducting element in series with said winding and operative to deliver only the odd half cycles of said alternating voltage to the output circuit through said winding, said odd half cycles being effective to establish saturation of said core member, means including a voltage divider and a unilateral conducting element in series to receive said alternating voltage and to derive therefrom a half wave signal corresponding to the even half cycles of said alternating voltage and equal to a predetermined amplitude fraction of said alternating voltage, and means coupling said half wave signal to said winding for establishing a predetermined degree of saturation of said core in response to said half wave signal.

7. A phase lead network comprising a pair of terminals for receiving an alternating voltage, a pair of output terminals across which an output voltage equal to a proportional-plus-derivative is to appear, means including a serially connected half wave rectifier and a saturable core reactor connecting the input and output terminals, said half wave rectifier permitting the saturation of said saturable core reactor during the half cycles of one sense of the applied alternating voltage, means operable to establish a predetermined degree of saturation of said saturable core reactor means during the half cycles of opposite sense of the applied voltage, said last named means including a unidirectional voltage reducing circuit coupled to the input of said network and to said saturable core reactor for impressing across said saturable core reactor a predetermined amplitude fraction of the half cycles of said opposite sense of the applied alternating voltage.

8. A device for coupling to an output circuit the proportional-plus-derivative voltage of a push-pull alternating voltage, comprising a saturable core reactor for each half of the push-pull voltage, means connecting each half of said push-pull alternating voltage to a respective saturable core reactor, a half wave rectifier in series with each of said saturable core reactors for coupling half wave cycles of one sense of each half of the push-pull voltage to the output circuit through the respective saturable core reactor, said half cycles being effective to establish a saturating flux in each of said saturable reactors, means for deriving from each half of said push-pull voltage separate half wave desaturating signals each having a sense opposite from said one sense and each equal to a predetermined fraction of the push-pull voltage, and means connecting the last-named means to each of said saturable core reactors to establish a predetermined degree of saturation of each saturable core reactor in response to the respective desaturating signal.

References Cited in the file of this patent

UNITED STATES PATENTS

| | | |
|---|---|---|
| 2,229,950 | Werner | Jan. 28, 1941 |
| 2,259,647 | Logan | Oct. 21, 1941 |